(12) United States Patent
Azuma et al.

(10) Patent No.: US 9,981,691 B2
(45) Date of Patent: May 29, 2018

(54) VEHICLE STEERING CONTROL APPARATUS

(71) Applicant: Mitsubishi Electric Corporation, Tokyo (JP)

(72) Inventors: Michitoshi Azuma, Tokyo (JP); Yukiyasu Akemi, Tokyo (JP); Kohei Mori, Tokyo (JP); Yu Takeuchi, Tokyo (JP); Toshihide Satake, Tokyo (JP); Masaya Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/182,105

(22) Filed: Jun. 14, 2016

(65) Prior Publication Data

US 2017/0137061 A1 May 18, 2017

(30) Foreign Application Priority Data

Nov. 17, 2015 (JP) ................................. 2015-224479

(51) Int. Cl.
*B62D 15/02* (2006.01)
*G05D 1/02* (2006.01)
(Continued)

(52) U.S. Cl.
CPC ....... *B62D 15/0285* (2013.01); *B62D 15/021* (2013.01); *B60W 10/20* (2013.01);
(Continued)

(58) Field of Classification Search
CPC .......................... B62D 15/0285; B62D 15/021
See application file for complete search history.

(56) References Cited

U.S. PATENT DOCUMENTS 7,813,855 B2 * 10/2010 Watanabe .......... B62D 15/0285
180/204
8,645,015 B2 * 2/2014 Oetiker ................. B60W 10/20
340/425.5
(Continued)

FOREIGN PATENT DOCUMENTS

DE    10 2015 115 254 A1    3/2016
EP       2 902 271 A1       8/2015
(Continued)

OTHER PUBLICATIONS

Communication dated Jan. 10, 2017, issued by the Japan Patent Office in counterpart Japanese Application No. 2015-224479.
(Continued)

*Primary Examiner* — Todd Melton
(74) *Attorney, Agent, or Firm* — Sughrue Mion, PLLC; Richard C. Turner

(57) ABSTRACT

A vehicle steering control apparatus having high robustness while ensuring the accuracy of automatic parking. The steering control apparatus includes a target parking position computing module to calculate a target parking position, a target line computing module to calculate a target parking line, an own vehicle position target attitude angle computing module to calculate an own vehicle position target attitude angle, an own vehicle attitude angle, and the target parking line, an own vehicle position target curvature computing module to calculate an own vehicle position target curvature, and a steering controller for calculating a target steering angle based on the own vehicle position target curvature and performing control such that the actual steering angle matches the target steering angle.

11 Claims, 7 Drawing Sheets

(51) Int. Cl.
*B60W 10/20* (2006.01)
*B60W 30/06* (2006.01)

(52) U.S. Cl.
CPC ......... *B60W 30/06* (2013.01); *B62D 15/0265* (2013.01); *G05D 1/0225* (2013.01)

(56) References Cited

U.S. PATENT DOCUMENTS

| | | | | |
|---|---|---|---|---|
| 9,174,676 | B2* | 11/2015 | Jecker | B62D 15/0285 |
| 9,475,492 | B2* | 10/2016 | Okano | H04N 7/18 |
| 9,731,764 | B2* | 8/2017 | Baek | B62D 15/0285 |
| 2004/0267423 | A1 | 12/2004 | Iwazaki et al. | |
| 2005/0027414 | A1 | 2/2005 | Iwazaki et al. | |
| 2013/0335553 | A1* | 12/2013 | Heger | B62D 15/0285 348/118 |
| 2015/0100177 | A1 | 4/2015 | Inagaki | |
| 2015/0203111 | A1* | 7/2015 | Bonnet | B62D 15/027 701/25 |
| 2015/0254981 | A1 | 9/2015 | Tachibana et al. | |
| 2015/0375740 | A1 | 12/2015 | Okamura et al. | |
| 2016/0078763 | A1* | 3/2016 | Kiyokawa | G06K 9/00812 382/104 |

FOREIGN PATENT DOCUMENTS

| | | |
|---|---|---|
| EP | 2 965 965 A1 | 1/2016 |
| JP | 2005014778 A | 1/2005 |
| JP | 2005014780 A | 1/2005 |
| JP | 2014034230 A | 2/2014 |
| JP | 2014-069722 A | 4/2014 |
| JP | 2015-074256 A | 4/2015 |
| KR | 10-2012-0082212 A | 7/2012 |

OTHER PUBLICATIONS

Communication dated Aug. 2, 2016, issued by the Japan Patent Office in corresponding Japanese Application No. 2015-224479.
Akihiko Takashima, et al., "Feedback Control of Non-holonomic Mobile Robots by Path-generating Regulator", Transaction of the Japan Society of Mechanical Engineers, Jan. 2004, pp. 120-126, vol. 70, No. 689.
Communication dated Mar. 5, 2018 from the German Patent and Trademark Office in counterpart application No. 10 2016 215 601.2.

* cited by examiner

VEHICLE STEERING CONTROL APPARATUS

TECHNICAL FIELD

The present invention relates to a vehicle steering control apparatus that determines a target parking path to a target parking space and carries out the steering of a steering wheel so as to cause a vehicle to travel along the target parking path, and more particularly to a vehicle steering control apparatus that generates a parking path for a vehicle and assists traveling of the vehicle.

BACKGROUND ART

An increasing number of vehicles have, in addition to an ordinary assistance function (assistance mode) that assists the steering ability of the driver, an automatic steering function (automatic steering mode) that does not require the driver to perform steering, as typified by parking assistance and lane-keeping traveling. In particular, the parking assistance plans a traveling path for the own vehicle so as to avoid the position of an obstacle and performs automatic steering such that the own vehicle follows the traveling path.

In the field of robotics, many findings have been obtained for a traveling path generation method. As one of generation methods that determine the attitude angle of a two-wheeled independently-driven mobile robot, there is a known method that executes feedback control, such that the mobile robot follows a target path, by using a group of specific functions based on information regarding the position and attitude angle of the mobile robot (see, for example, Non-Patent Document 1).

Also, many patent applications have been filed for a parking assistance apparatus for a four-wheel vehicle. For example, the following parking assistance apparatuses are known: a parking assistance apparatus that enables a vehicle to travel while turning the steering wheel so as to prevent a collision with an object in the surroundings (see Patent Document 1); and a parking assistance apparatus that generates a parking path based on an input from an obstacle detection sensor and, if the vehicle is moved along the parking path and comes close to an obstacle, calculates a distance to the obstacle and displays the calculated distance on a display portion (see Patent Document 2).

CITATION LIST

Non-Patent Document

Non-Patent Document 1: Feedback Control of Non-holonomic Mobile Robots by Path-generating Regulator, Transactions of the Japan Society of Mechanical Engineers (C), vol. 70, No. 689 (2004-1), Reference No. 03-0303

Patent Documents

Patent Document 1: Japanese Laid-Open Patent Publication No. 2014-69722
Patent Document 2: Japanese Laid-Open Patent Publication No. 2015-74256

SUMMARY OF THE INVENTION

Problems to be Solved by the Invention

Non-Patent Document 1 discloses a method of generating a target attitude angle of a robot. FIG. 9 shows an example in which the method of generating a target attitude angle is applied to automatic parking. As shown in FIG. 9, in the case where the own vehicle 1 is to be parked between two parked vehicles 2, a target point 112 is first set. The target point 112 is the final target parking position indicated by a single point. Arrows shown in the diagram each show a target attitude of the own vehicle 1, with the head of the arrow indicating the front side of the vehicle and tail thereof indicating the rear side of the vehicle. The target attitude is determined based on the group of specific functions described in Non-Patent Document 1. The own vehicle 1 controls its attitude to match the target attitude, and moves toward the arrow target point 112 along a parking path 115. When the own vehicle 1 finally reaches the target point 112, parking ends.

However, the parking path 115 based on the target attitude described in Non-Patent Document 1 is a path that requires a sudden correction of the attitude of the own vehicle 1 when the own vehicle 1 comes into proximity of the target point 112. Accordingly, there is a problem in that the driver feels uncomfortable with such a sudden attitude correction during automatic parking, resulting in a reduction in drivability. Particularly when the parking space is small, if automatic parking is started using the method of generating a target attitude angle, the vehicle comes closer to a parked vehicle in a diagonally inclined manner, and thus the own vehicle 1 may collide with the parked vehicle 2. Also, Non-Patent Document 1 is silent on a specific method of following the target steering angle.

In addition, the parking assistance apparatus disclosed in Patent Document 1 requires a line detecting portion that detects parking lot lines provided on the vehicle travel surface, and the parking assistance apparatus disclosed in Patent Document 2 is configured to, when the own vehicle is brought partially into a parking lot and then stops, perform steering control to bring the own vehicle to a center position between the already parked vehicles so as to prevent the own vehicle from colliding with the parked vehicles, and thus is not configured to determine a target parking path to a target parking space.

The present invention has been made in order to solve the problem descried above, and it is an object of the present invention to provide a vehicle steering control apparatus for a vehicle including an automatic parking system having high robustness and capable of generating a target attitude angle that reduces a sense of discomfort when correction of the attitude of the vehicle is performed during parking.

Solution to the Problems

A vehicle steering control apparatus according to the present invention includes: a traveling direction detector for detecting a traveling direction of an own vehicle; a steering angle detector for detecting an actual steering angle of the own vehicle; an own vehicle position attitude angle computing module to calculate an own vehicle position and an own vehicle attitude angle from a reference point based on a vehicle signal from the own vehicle; an obstacle detector for detecting an obstacle around the own vehicle including a parked vehicle and outputting an obstacle detection result; a target parking position computing module to calculate a target parking position from the obstacle detection result; a target line computing module to calculate a target parking line passing through the target parking position based on an own vehicle target parking attitude calculated from the target parking position and an attitude of the parked vehicle; a gain computing module to calculate a target attitude angle calculation gain and a target curvature calculation gain based on the obstacle detection result and the target parking position or the own vehicle position; an own vehicle position target attitude angle computing module to calculate an own vehicle position target attitude angle based on the traveling direction, the own vehicle position, the target parking line, and the target attitude angle calculation gain; an own vehicle position target curvature computing module to calculate an own vehicle position target curvature based on the own vehicle position, the own vehicle attitude angle, the target parking line, the target curvature calculation gain, and the own vehicle position target attitude angle; and a steering controller for calculating a target steering angle based on the own vehicle position target curvature and performing control such that the actual steering angle matches the target steering angle, wherein control is performed such that the own vehicle travels with the own vehicle position target attitude angle so as to be aligned on the target parking line.

Effect of the Invention

With the steering control apparatus for a vehicle including an automatic parking system according to the present invention, it is possible to provide an automatic parking system that has high robustness and enables the vehicle to be smoothly parked to a target parking position from any position where the vehicle is stopped.

DESCRIPTION OF EMBODIMENTS

Embodiment 1

Figure 1:
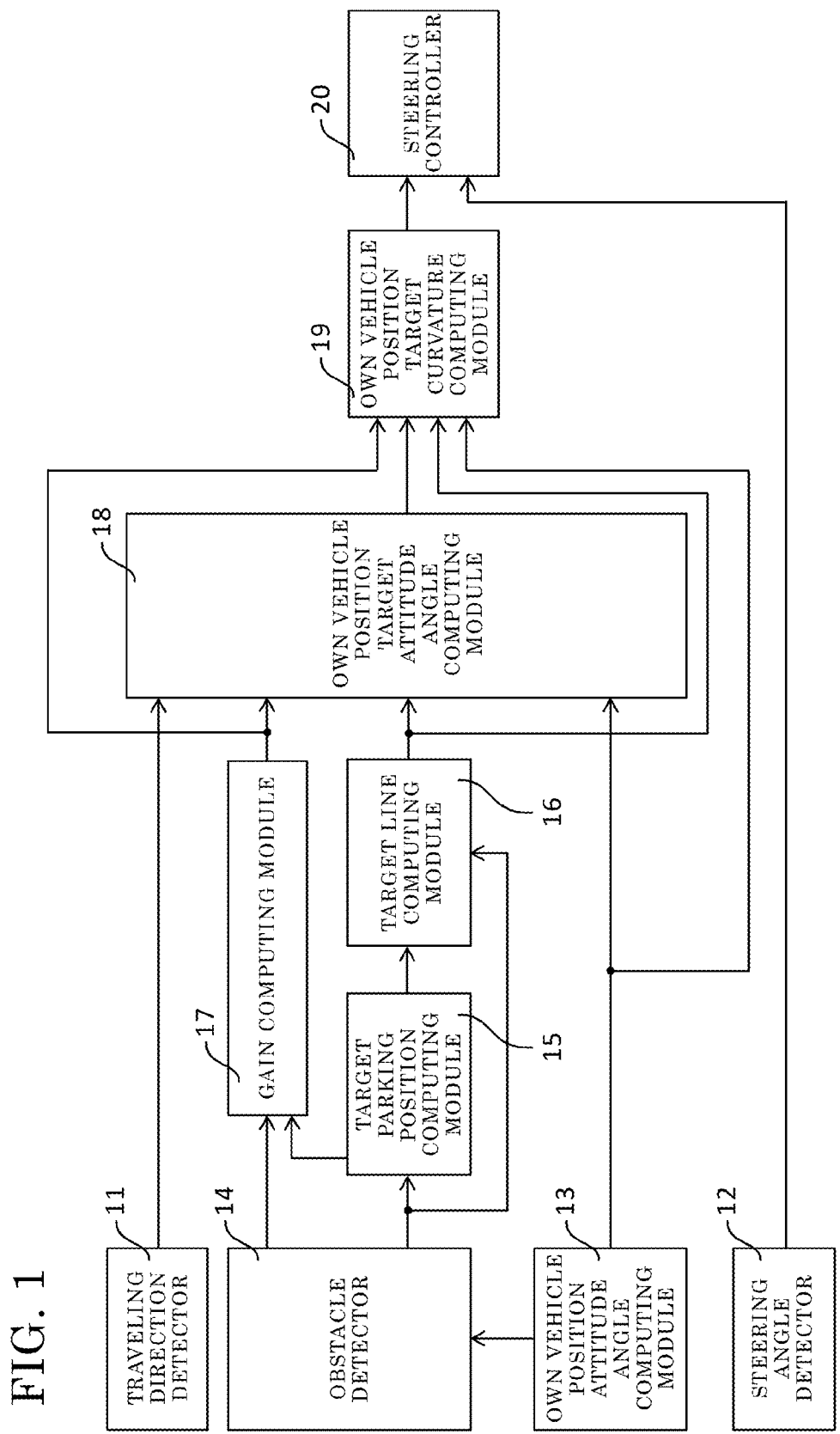
FIG. 1 is a schematic configuration diagram of a vehicle steering control apparatus according to Embodiment 1 of the present invention.

Hereinafter, a vehicle steering control apparatus according to Embodiment 1 of the present invention will be described with reference to FIGS. 1 to 4. FIG. 1 is a schematic configuration diagram of a vehicle steering control apparatus according to Embodiment 1 of the present invention, and also is a diagram illustrating a method of determining a target steering angle.

In FIG. 1, the vehicle steering control apparatus includes a traveling direction detector 11 that detects a traveling direction of the own vehicle, a steering angle detector 12 that detects an actual steering angle of the own vehicle, an own vehicle position attitude angle computing module 13 that calculates an own vehicle position and an own vehicle attitude angle from a reference point based on vehicle signals of detected physical quantities of the own vehicle such as the moving distance and yaw rate of the vehicle, and an obstacle detector 14 that detects a position and an attitude of the own vehicle and a position and an attitude of an obstacle in the surroundings of the own vehicle including a parked vehicle and outputs obstacle detection results.

Furthermore, the vehicle steering control apparatus also includes a target parking position computing module 15 that calculates a target parking position based on the obstacle detection results such as obstacle position information obtained from the obstacle detector 14, a target line computing module 16 that determines a target parking attitude angle of the own vehicle calculated from the target parking position (target point) obtained from the target parking position computing module 15 and a parked vehicle attitude angle (the slope of a target parking line) obtained from the obstacle detector 14 and calculates a target parking line passing through the target parking position, and a gain computing module 17 that calculates a target attitude angle calculation gain and a target curvature calculation gain based on the obstacle detection results obtained from the obstacle detector 14 and the target parking position obtained from the target parking position computing module 15.

An own vehicle position target attitude angle computing module 18 calculates a target attitude angle from the own vehicle position based on the traveling direction of the own vehicle obtained from the traveling direction detector 11, the own vehicle position obtained from the own vehicle position attitude angle computing module 13, the target parking line obtained from the target line computing module 16, and the target attitude angle calculation gain obtained from the gain computing module 17. An own vehicle position target curvature computing module 19 calculates an own vehicle position target curvature for performing control such that the attitude angle of the own vehicle follows the target attitude angle based on the own vehicle position and the own vehicle attitude angle obtained from the own vehicle position attitude angle computing module 13, the target parking line obtained from the target line computing module 16, the target curvature calculation gain obtained from the gain computing module 17, and the own vehicle position target attitude angle from the own vehicle position target attitude angle computing module 18.

A steering controller 20 calculates a target steering angle based on the own vehicle position target curvature calculated by the own vehicle position target curvature computing module 19 and performs control such that the actual steering angle detected by the steering angle detector 12 matches the target steering angle. In this way, the steering controller 20 performs control such that the own vehicle travels with the own vehicle position target attitude angle so as to be aligned on the target parking line, and thus enables the own vehicle to be parked at the target parking position.

The obstacle detector 14 acquires the positions of obstacles by using ultrasonic sonars. The ultrasonic sonars are attached on both sides and in the front and rear of the own vehicle, and emit ultrasonic waves during travel. Each ultrasonic sonar has a different main purpose. The ultrasonic sonars attached on both sides are for detecting a parking space, and the ultrasonic sonars attached in the front and rear are for detecting the position of an obstacle.

The principles of an ultrasonic sonar will be briefly described below. First, in response to an instruction from a sonar ECU, the ultrasonic sonar emits ultrasonic waves. The ultrasonic waves propagate in the space and are reflected by an obstacle, if any. The ultrasonic sonar receives the reflected waves and thereby the distance to the obstacle can be acquired. The distance to the obstacle can be calculated based on the propagation time taken for the ultrasonic waves to be emitted and received and the propagation speed of the ultrasonic waves.

Furthermore, an aperture synthesis technique is also well known that can provide not only the distance to the obstacle, but also the position of an obstacle with high accuracy by using a plurality of receivers. The obstacle detector 14 acquires the position of an obstacle and the distance to the obstacle by using such a technique.

As described above, by attaching ultrasonic sonars on both sides and in the front and rear of the own vehicle, ultrasonic waves are emitted from the ultrasonic sonars while the own vehicle is traveling, and thus the position of an obstacle in the surroundings of the own vehicle can be identified and a parking space can be found based on the position of the obstacle. A brake for an obstacle and a path for avoiding the obstacle can be generated before a parking operation is performed.

Furthermore, with a combined use of the own vehicle position attitude angle computing module 13 and the obstacle detector 14, a positional relationship between an obstacle and the own vehicle can be obtained. The own vehicle position attitude angle computing module 13 uses a technique called "dead-reckoning" that estimates the own vehicle position from arbitrary reference coordinates based on information from sensors attached to the vehicle. As an example of dead-reckoning, the own vehicle position and the own vehicle attitude angle are obtained from a moving distance and an attitude angle. The moving distance is obtained by integrating a vehicle speed of the own vehicle obtained from the rotation speed of the tires by using a wheel speed sensor. With respect to the attitude angle, a yaw rate is detected by using a yaw rate sensor provided in the own vehicle, and the detected yaw rate is then integrated to obtain a yaw angle. The coordinates of the own vehicle can be obtained by calculating the moving distance and the attitude angle for each sampling time.

Likewise, with respect to position information regarding the position to an obstacle, the own vehicle position estimated by dead-reckoning, the distance from the own vehicle position to an ultrasonic sonar, and the propagation distance when the ultrasonic sonar has detected an obstacle vehicle are summed, thereby obtaining the position and attitude of a parked vehicle.

The target parking position computing module 15 determines a parking space based on the obstacle detection results such as the position of the obstacle and the distance to the obstacle detected by the obstacle detector 14, and fixedly determines a target parking position if a parking space where the own vehicle can be parked is found. First, when the own vehicle travels in the surrounding of a parked vehicle, the ultrasonic sonars start to perform detection for a parked vehicle or an obstacle in the surroundings of the own vehicle. When the own vehicle passes the surroundings of a parked vehicle, the position and attitude of the parked vehicle are detected, and the ultrasonic sonars determine the presence or absence of an obstacle.

The calculation apparatuses described above are implemented by a memory storing a program therein and a CPU, or an incorporated partial logic circuit.

Figure 2:
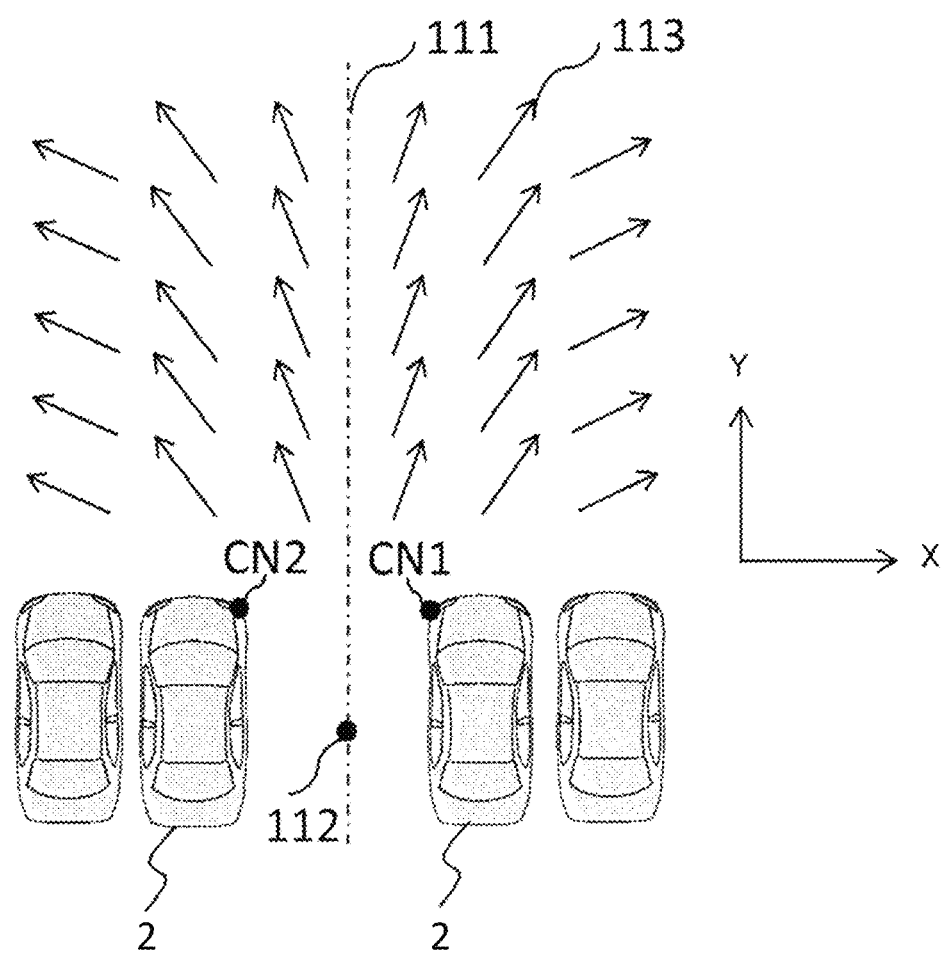
FIG. 2 is an explanatory diagram illustrating a target attitude angle at each position when a shifter is in R range in the vehicle steering control apparatus according to Embodiment 1 of the present invention.

Here, corner position coordinates CN1 ([X1, Y1]) and CN2 ([X2, Y2]) of parked vehicles 2 shown in FIG. 2 are detected so as to determine whether or not there is a parking space. In the coordinate system used herein, the start time of dead-reckoning is defined as the origin of the coordinate system, the direction of travel of the own vehicle 1 is defined as the X direction and the direction perpendicular to the direction of travel is defined as the Y direction. Accordingly, the parking space can be indicated by the difference between X2 and X1.

Here, in the case of a small parking space, it is often the case that the own vehicle is parked at the center between the parked vehicles 2. In this case, the average between X2 and X1 may be determined as an X component of the target point 112, which is the target parking position. In the case of a large parking space, the target point 112 is set to a position offset to one of the parked vehicles 2. The value in the Y direction is set to an arbitrary value that does not cause the own vehicle to be out of the parking space. In this way, the target point 112, which is the target parking position, can be determined.

The target line computing module 16 sets, in addition to the target point 112 [Xt, Yt], a slope γt of a target parking line 111 passing through the target point 112. If it is determined that there is an available parking space, the target parking line 111 including the target point 112, which is the final parking position, is determined. According to Non-Patent Document 1, only one point is set as the target point 112, but according to the present embodiment of the invention, the target parking line 111 including the target point 112 is determined.

In the case of ordinary side-by-side parking, as the attitude angle, a value obtained by making an inclination from the slope of the own vehicle at the time of detection of a parking space by 90 degrees may be used as the slope of the target parking line 111. On the other hand, in the case where parked vehicles are parked with a large inclination such as diagonal parking, the slopes of two parked vehicles may be detected by using the ultrasonic sonars, thereby setting the average value of the attitude angles of the two parked vehicles as the slope of the target parking line 111. In this way, the target parking attitude of the own vehicle calculated from the target parking position and the attitudes of parked vehicles is determined. This makes it possible to, not only in the case of ordinary side-by-side parking, but also in the case where parked vehicles are parked with an inclination, set the target parking line 111 so as to be parallel to parked vehicles.

The gain computing module 17 has a target attitude angle calculation gain k1 for calculating the target attitude angle and target curvature calculation gains k2, k3 and k4 for calculating a target curvature. These gains are calculated by the obstacle detector 14. Here, the gains are calculated based on the distance between the own vehicle position and the target parking line 111 at the time of start of automatic steering. If the distance between the own vehicle position and the target parking line 111 at the time of start of automatic steering is greater than a threshold value, the gains are set to be small. On the other hand, if the distance between the own vehicle position and the target parking line 111 is smaller than the threshold value, the gains are set to be large.

The slope of the target attitude angle can be adjusted by changing the target attitude angle calculation gain k1. If the attitude angle calculation gain k1 is small, the slope of the target attitude angle can be made small. On the other hand, if the target attitude angle calculation gain k1 is large, the slope of the target attitude angle is also large. Next, the target curvature calculation gains k2, k3 and k4 are gains for controlling the target curvature. By increasing the gains, correction can be made so as to rapidly change the target curvature of the own vehicle. If the parking space is sufficiently small, it is necessary to increase these gains so as to rapidly correct the attitude of the own vehicle to be aligned on the target parking line 111. In this way, by variably setting the gains based on the distance between the own vehicle position and the target parking line 111 at the time of start of automatic parking, if the distance is greater than or equal to the threshold value, the path to the parking space is preferentially used, and thus the distance required for parking can be shortened.

The traveling direction detector 11 detects a direction of movement of the vehicle. This may be achieved by acquiring a signal indicating a shifter position. For the shifter position, a signal determining whether the shifter is in D (drive) range or R (reverse) range is used for the calculation of the target attitude angle and the target curvature, which will be described later.

Next, a specific calculation method performed by the own vehicle position target attitude angle computing module 18 will be described. The own vehicle position target attitude angle computing module 18 receives an input of a traveling direction signal obtained by the traveling direction detector 11, the target parking line 111 including the target point 112 determined by the target line computing module 16, the target attitude angle calculation gain based on the gain computing module 17, an own vehicle position signal determined by the own vehicle position attitude angle computing module 13.

First, a positional deviation between the target parking line 111 including the target point 112 and the own vehicle position is calculated. The positional deviation is expressed by the following Expressions (1) and (2), where the own vehicle position is represented by [x, y], the target parking position is represented by [Xt, Yt], and the slope of the target parking line 111 is represented by γt.

$$e1 = -(x-Xt)\sin(\gamma t) + (y-Yt)\cos(\gamma t) \quad (1)$$

$$e1 = (x-Xt)\sin(\gamma t) - (y-Yt)\cos(\gamma t) \quad (2)$$

Expressions (1) and (2) show the positional deviation between the own vehicle position and the target point 112, which is the final parking position. If the own vehicle position approaches the target point 112, the value of positional deviation e1 becomes small. If the positional deviation e1 takes a value of 0, it means that the own vehicle has reached the target parking position. Expression (1) shows the calculation method when the shifter is in R, and Expression (2) shows the calculation method when the shifter is in D.

Based on the positional deviation e1, the target attitude angle γ* from the own vehicle position is obtained by Expression (3):

$$\gamma^* = \gamma t + \arcsin(\tan h(k1 \cdot e1)) \quad (3),$$

where k1 is the target attitude angle calculation gain. The target attitude angle when this gain is large is larger than that when the gain is small. By setting the function of Expression (3), it is possible to calculate a target attitude angle so as to be aligned with the target parking line 111.

FIG. 2 shows an explanatory diagram illustrating a target attitude angle at each position when the shifter is in R range in the vehicle steering control apparatus according to Embodiment 1. As described above, the target attitude angle is set based on the positional deviation between the target parking line 111 and the own vehicle position such that the own vehicle reaches the target point 112. Each arrow 113 in the diagram shows the target attitude angle when it is assumed that the own vehicle is at the position of the arrow. The head of the arrow 113 indicates the front side of the own vehicle, and the tail of the arrow 113 indicates the rear side of the own vehicle.

First, attention is given to the arrows in the proximity of the target parking line 111. As shown in FIG. 2, it is clear that the arrows in the proximity of the target parking line 111 are present along the target parking line 111. If the own vehicle is at any one of the positions, the own vehicle can be parked without significantly changing the target attitude angle 113. If the own vehicle moves backward, the own vehicle can be parked with the final parking attitude.

Next is a description of a case where the own vehicle is at a position away from the target parking line 111. In this case, the positional deviation from the target parking line 111 is large. As described above, correction of the attitude is performed when the positional deviation is large, and thus the slope of the target attitude angle becomes large. That is, when the own vehicle position is away from the target parking line 111, the slope of the target attitude angle 113 also becomes large.

Figure 3:
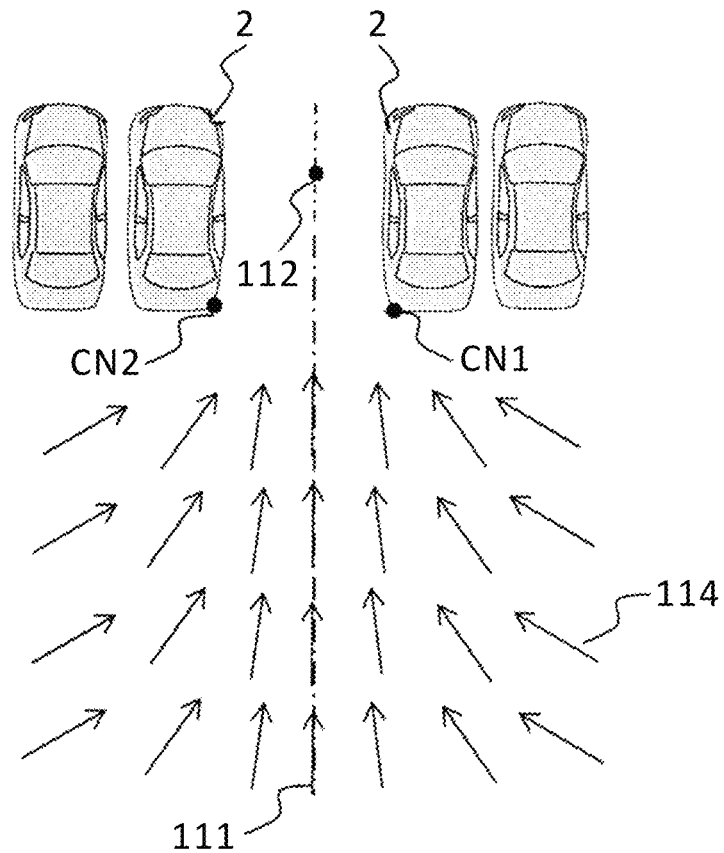
FIG. 3 is an explanatory diagram illustrating a target attitude angle at each position when the shifter is in D range in the vehicle steering control apparatus according to Embodiment 1 of the present invention.

FIG. 3 shows an explanatory diagram illustrating a target attitude angle at each position when the shifter is in D range in the vehicle steering control apparatus according to Embodiment 1. As described above, the target attitude angle is set based on the positional deviation between the target parking line 111 and the own vehicle position such that the own vehicle reaches the target point 112. Each arrow 114 in the diagram shows the target attitude angle when it is assumed that the own vehicle is at the position of the arrow. As with the arrow 113, the head of the arrow 114 indicates the front side of the own vehicle, and the tail of the arrow 114 indicates the rear side of the own vehicle.

As shown in FIG. 3, first, when the own vehicle is at a position in the proximity of the target parking line 111, the target attitude angles are present along the target parking line 111 as indicated by the arrows in the proximity of the target parking line 111. Next, when the own vehicle is at a position away from the target parking line 111, the positional deviation is large as indicated by the arrows located away from the target parking line 111. Accordingly, when the positional deviation is large, the target attitude angle is also large.

The foregoing has described the method of generating the target attitude angle γ* when the shifter is in D range and the method of generating the target attitude angle γ* when the shifter is in R range. When the shifter is in R range, the rear side of the own vehicle converges to the target parking line 111. On the other hand, when the shifter is in D range, the front side of the own vehicle converges to the target parking line 111. That is, regardless of whether the own vehicle travels forward or backward, the target attitude angle for converging the own vehicle to the target parking line 111 can be generated.

In short, the own vehicle position target attitude angle computing module 18 calculates, based on "own vehicle position information" obtained from the own vehicle position attitude angle computing module 13, the vehicle attitude angle at that position by using Expression (3) as the own vehicle position target attitude angle. The own vehicle position target attitude angle corresponds to, for example, the direction of any one of the arrows shown in FIGS. 2 and 3. Although many arrows are shown in FIGS. 2 and 3, these arrows are virtually shown to indicate a target attitude angle at each position if the own vehicle is at that position. Meanwhile, based on the obstacle position information obtained from the obstacle detector 14, the position and attitude of the vehicle in the final state are determined, which are used as the target values in the "final state" and set as the target parking position and the target parking attitude angle.

In summary, the target parking attitude angle is a target attitude angle in the "final state" (=at the time of completion of parking), and the own vehicle position target attitude angle is a target attitude angle during the "process" until the own vehicle reaches the target parking position. Accordingly, in the end, the own vehicle reaches the target parking position, and thus the target parking attitude angle is equal to the own vehicle position target attitude angle (target parking attitude angle=own vehicle position target attitude angle).

Here, when a comparison is made between the target attitude angle of Embodiment 1 of the present invention and that of Non-Patent Document 1, according to Non-Patent Document 1, the target attitude angle is generated with respect to the target point 112, whereas according to the present embodiment, the target attitude angle is generated such that the own vehicle converges to the target parking line 111. Accordingly, the target attitude angle calculation method according to the present embodiment does not require a significant correction of the attitude of the own vehicle in the proximity of the target point 112, thus achieving a prominent effect that a target attitude angle suitable for automatic parking can be generated.

The own vehicle position target curvature computing module 19 receives an input of the target parking line 111 including the target point 112 obtained from the target line computing module 16, the target curvature calculation gain based on the gain computing module 17, signals indicative of the own vehicle position and own vehicle attitude angle obtained from the own vehicle position attitude angle computing module 13, and the own vehicle position target attitude angle from the own vehicle position target attitude angle computing module 18.

The own vehicle position target curvature computing module 19 calculates the own vehicle target curvature based on the own vehicle position target attitude angle calculated by the own vehicle position target attitude angle computing module 18, and controls the curvature of the own vehicle so as to follow the target attitude angle. By multiplying the deviation of the attitude angle by the gains, a steering angle that causes the attitude angle of the own vehicle to converge to the target parking attitude angle is obtained.

A specific measure for correcting the target steering angle that can be followed by the target attitude angle, the own vehicle attitude angle, the target parking position and the own vehicle position will be described below.

Expression (4) shows an attitude angle deviation e2 between the target attitude angle γ* from the own vehicle position and an own vehicle actual attitude angle γ.

$$e2 = \gamma^* - \gamma \quad (4)$$

A target curvature ρ* calculated based on the deviations obtained by Expression (1) or (2) and Expression (4) can be expressed by the following Expression (5).

[Math. 1]

$$\rho^* = k_2 \cos(\gamma_t - \gamma^*)\sin(\gamma_t - \gamma^*) + k_3 e_1 \cos\left(\gamma_t - \frac{\gamma^* + \gamma}{2}\right)\mathrm{sinc}\left(\frac{e_2}{2}\right) + k_4 e_2 \quad (5)$$

In the above expression, k2, k3 and k4 are target curvature calculation gains determined by the gain computing module 17. As shown in Expression (5), the target curvature ρ* is determined so as to reduce not only the positional deviation e1, but also the attitude angle deviation e2 simultaneously. That is, the target curvature ρ* increases as the position of the own vehicle is further away from the target parking line 111 or as the difference of the own vehicle attitude angle from the target attitude angle is larger.

Here, the target curvature ρ* indicates an inverse of the radius of a turn of the vehicle. Theoretical Expression (6) is given that defines the relationship between the radius of a turn of the vehicle and the steering angle (reference source: Vehicle Dynamics and Control, second edition, by Masato Abe).

[Math. 2]

$$\rho = (1 + AV^2)\frac{1}{\delta} \quad (6)$$

where δ=nθ

In the above expression, V is the traveling speed of the own vehicle, A is the stability factor, l is the wheel base of the vehicle, δ is the front wheel actual steering angle, n is the steering gear ratio (front wheel actual steering angle/steering angle), and θ is the steering angle.

By using the theoretical expression given above, the target steering angle can be calculated by using the target curvature. The steering controller 20 performs control such that the target steering angle and the actual steering angle match, and thus the own vehicle can achieve the target attitude.

Here, the relationships of Expressions (1) to (5) will be summarized. Expression (1) and Expression (2) define a positional deviation between the own vehicle position and the target line, Expression (3) defines the own vehicle position target attitude angle for correcting the positional deviation. Expression (4) shows an attitude angle deviation between the own vehicle position target attitude angle and the own vehicle actual attitude angle. Expression (5) shows the target curvature for simultaneously correcting the positional deviation and the attitude angle deviation.

In other words, in the present embodiment, the target attitude angle and the target curvature from the own vehicle position are determined for each sampling time such that the own vehicle converges to the target parking line 111. Thus, the target steering angle for automatic steering is also determined, and the steering wheel is automatically steered so as to follow the target steering angle, as a result of which a smooth parking operation can be performed.

Figure 4:
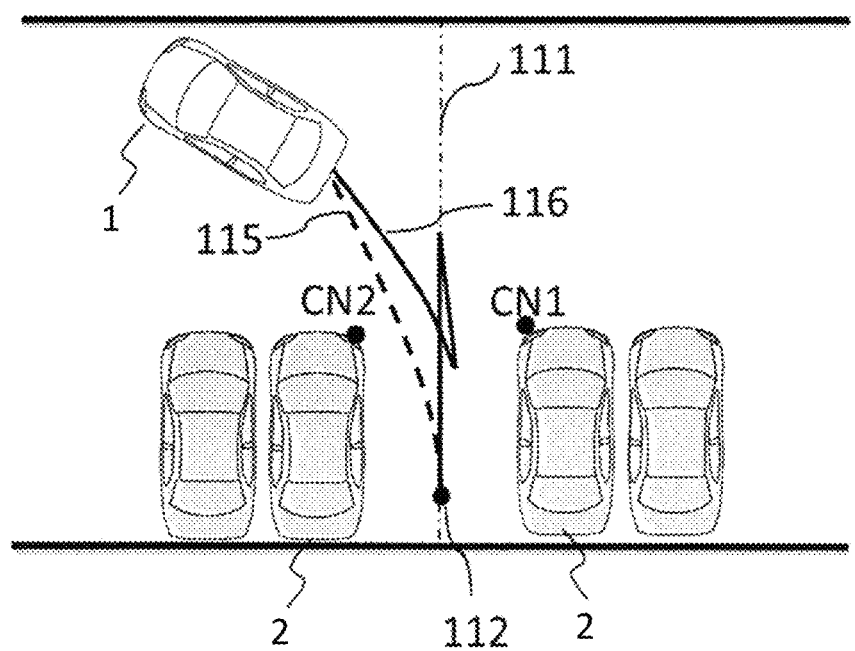
FIG. 4 is an explanatory diagram illustrating a comparison of a parking path between the vehicle steering control apparatus according to Embodiment 1 of the present invention and that of Non-Patent Document 1.

As shown in FIG. 4, in the case where a parking path 116 according to Embodiment 1 is used, correction of the attitude angle of the vehicle so as to be aligned with the target parking line 111 is performed earlier than in the case where the parking path 115 of Non-Patent Document 1 is used, but the moving distance required for parking is longer than the parking path 115.

However, according to the invention of Embodiment 1, it is possible to provide a system having high robustness that can reduce the attitude angle deviation and follow the target parking position regardless of the position of the own vehicle.

Also, in Embodiment 1, the position of an obstacle is identified by using ultrasonic sonars, but the position of or the distance to an obstacle in the surroundings or a white line may be detected in the same manner by using image capturing apparatuses such as cameras. Furthermore, a sensor fusion technique may be used that identifies the presence or absence of an obstacle in the image capturing range by using cameras and recognizes the position of the obstacle with high accuracy based on the identified portion and distance information obtained by ultrasonic sonars.

Also, the method of generating the target attitude angle and the target curvature according to Embodiment 1 can be adapted to diagonal parking, in addition to side-by-side parking, by simply changing the target point 112 and the slope of the target parking line 111. A difference between side-by-side parking and diagonal parking is the slope of the target parking line 111, and thus it is not necessary to change the target point 112 according to the type of parking. Since the present invention can be used universally in an indiscriminate manner regardless of whether the type of parking is side-by-side parking or diagonal parking, it is not necessary to provide an additional storage device for each type of parking.

Embodiment 2

A vehicle steering control apparatus according to Embodiment 2 of the present invention will be described next with reference to FIGS. 5 and 6.

Embodiment 1 has described the method of calculating the target attitude angle at each position and the method of correcting the attitude angle of the own vehicle based on the calculated target attitude angle. However, the gain computing module 17 is configured to variably set the target attitude angle calculation gain and the target curvature calculation gain according to the distance between the own vehicle and the target parking line 111. Accordingly, the parking path varies depending on the position of the own vehicle position and thus is not stabilized, which may give the driver a sense of discomfort. Therefore, the invention of Embodiment 2 has been made to solve such a problem.

Figure 5:
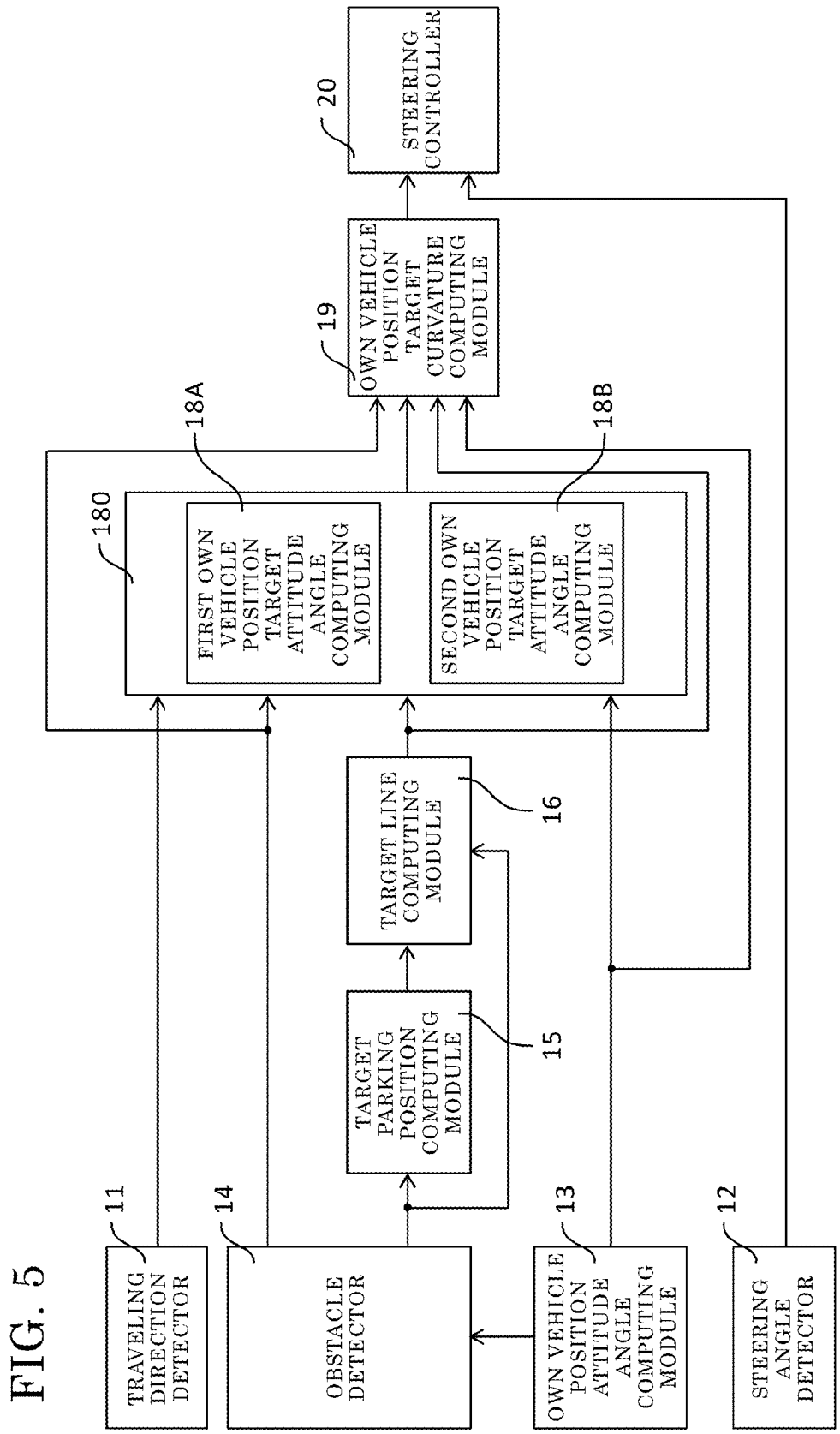
FIG. 5 is a schematic configuration diagram of a vehicle steering control apparatus according to Embodiment 2 of the present invention.

FIG. 5 is a schematic configuration diagram of a vehicle steering control apparatus according to Embodiment 2 of the present invention, and is also a diagram illustrating a method of calculating a target steering angle.

In Embodiment 2, as shown in FIG. 5, the gain computing module 17 is omitted, fixed gains are used, and a own vehicle position target attitude angle computing module 180 is configured to include a first own vehicle position target attitude angle computing module 18A and a second own vehicle position target attitude angle computing module 18B. The other constituent elements are the same as those of Embodiment 1 shown in FIG. 1. Accordingly, the same or corresponding portions are denoted by the same reference numerals, and the description thereof is omitted.

Note that, in FIG. 5, the obstacle detector 14 is configured to determine the target attitude angle calculation gain and the target curvature calculation gain obtained based on the position of an obstacle and the own vehicle position as fixed gains, and output the gains to the own vehicle position target attitude angle computing module 180. Accordingly, the gain computing module 17 is omitted. However, it is also possible to provide the gain computing module 17 as in FIG. 1, and use fixed gain values. In short, the gain computing module may be provided separately as shown in FIG. 1, or may be incorporated in the obstacle detector 14.

In Embodiment 1, the target attitude angle calculation gain and the target curvature calculation gain are calculated according to the distance between the target parking line 111 and the vehicle at the time of start of automatic parking, and the target steering angle based on the target parking line 111 is calculated by using the calculated gains.

In Embodiment 2, the target attitude angle calculation gain and the target curvature calculation gain are fixed values calculated by the obstacle detector 14, and the first own vehicle position target attitude angle computing module 18A and the second own vehicle position target attitude angle computing module 18B are switched depending on the distance between the target parking line 111 and the own vehicle position.

Here, the first own vehicle position target attitude angle computing module 18A is an own vehicle position target attitude angle computing module that corresponds to the own vehicle position target attitude angle computing module 18 in Embodiment 1 and that calculates the own vehicle position target attitude angle such that the own vehicle converges on the target parking line 111 at the target attitude angle. The second own vehicle position target attitude angle computing module 18B is an own vehicle position target attitude angle computing module that corresponds to a target attitude angle determining means such as the one disclosed in Non-Patent Document 1 and that calculates the own vehicle position target attitude angle such that the own vehicle converges to the target parking position 112 at the target attitude angle.

As already shown in FIG. 4, in the case where the parking path 116 according to Embodiment 1 is used, correction of the attitude angle of the vehicle so as to be aligned with the target parking line 111 is performed earlier than in the case where the parking path 115 of Non-Patent Document 1 is used, but the moving distance required for parking is longer than the parking path 115.

Figure 6:
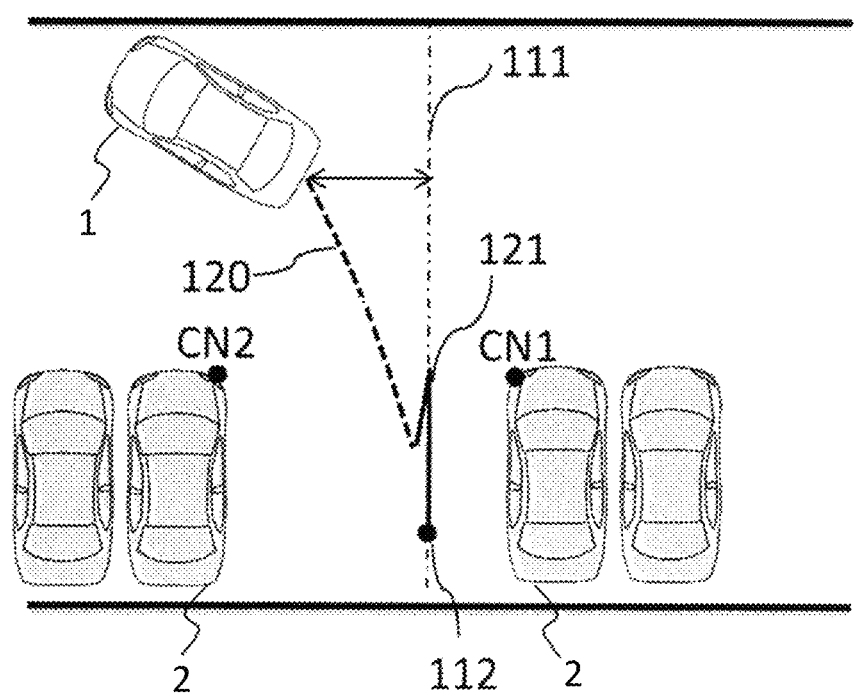
FIG. 6 is an explanatory diagram illustrating a parking path of the vehicle steering control apparatus according to Embodiment 2 of the present invention.

According to the invention of Embodiment 2, in order to shorten the moving distance required for parking, as shown in FIG. 6, if the distance between the target parking line 111 and the own vehicle 1 is less than or equal to a threshold value, the parking space is small, and a collision with the parked vehicles 2 can be avoided by causing the attitude angle of the vehicle to be aligned with the target parking line 111. Accordingly, the parking path is determined by using only the second own vehicle position target attitude angle computing module 18B.

On the other hand, if the distance between the target parking line 111 and the own vehicle 1 is greater than or equal to the threshold value, the first own vehicle position target attitude angle computing module 18A is used to cause the own vehicle 1 to move along a parking path 120 without significantly changing its attitude angle until the vehicle moves to the proximity of the target parking position. When the own vehicle 1 approaches a parked vehicle, the shifter is temporarily changed, and thereafter a parking path 121 that causes the attitude to be aligned with the target parking line 111 is determined by using the second own vehicle position target attitude angle computing module 18B.

The second own vehicle position target attitude angle computing module 18B is useful in that when the parking space is small, a collision with the obstacle can be avoided by causing the attitude angle to be aligned on the target parking line 111. On the other hand, when the parking space is sufficiently large, after the vehicle enters the parking space by using the sufficient space, the attitude angle is caused to follow the target parking line 111.

As described above, according to the invention of Embodiment 2, the target attitude angle can be fixed by using fixed values for the target attitude angle calculation gain and the target curvature calculation gain, thus making it possible to reduce the driver's sense of discomfort with parking. Furthermore, the first own vehicle position target attitude angle computing module 18A and the second own vehicle position target attitude angle computing module 18B are switched according to the distance between the own vehicle 1 and the target parking line 111, thus making it possible to achieve a prominent effect that the time required for parking can be shortened.

Embodiment 3

Next, a vehicle steering control apparatus according to Embodiment 3 of the present invention will be described with reference to FIG. 7.

According to the invention of Embodiment 2, the distance between the own vehicle position and the target parking line is used to switch between the first own vehicle position target attitude angle computing module 18A and the second own vehicle position target attitude angle computing module 18B, but they may be switched according to the distance between the own vehicle position and the target parking position.

Figure 7:
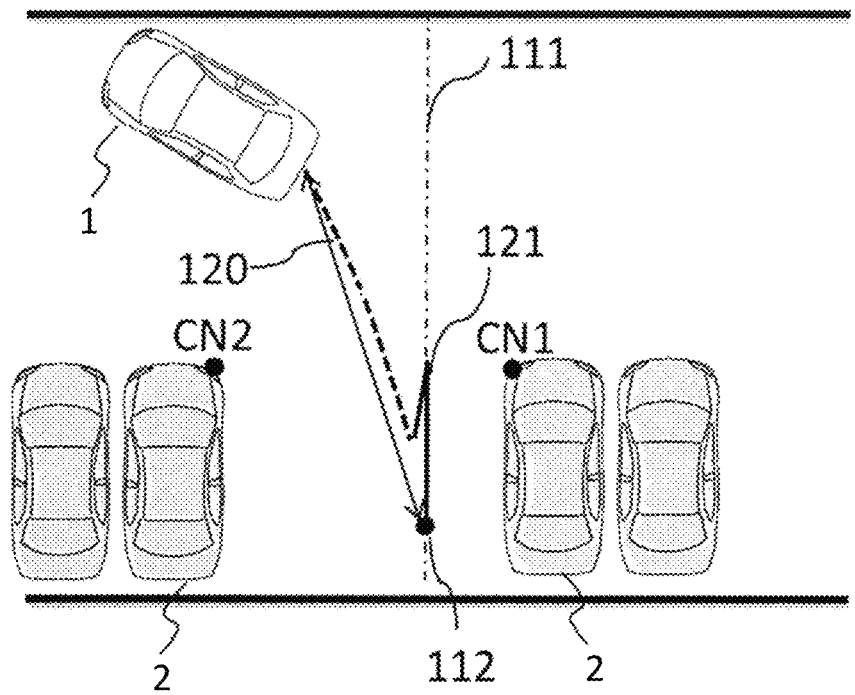
FIG. 7 is an explanatory diagram illustrating a parking path of a vehicle steering control apparatus according to Embodiment 3 of the present invention.

FIG. 7 is an explanatory diagram illustrating a parking path based on a target steering angle calculation method performed by the vehicle steering control apparatus according to Embodiment 3. If the distance between the target point 112, which is the target parking position, and the own vehicle 1 is less than or equal to a threshold value, the second own vehicle position target attitude angle computing module 18B is preferentially used so as to correct the attitude angle of the own vehicle 1, instead of shortening the moving distance. On the other hand, if the distance between the target point 112 and the own vehicle 1 is greater than or equal to the threshold value, the first own vehicle position target attitude angle computing module 18A is used to cause the own vehicle 1 to move along the parking path 120 without significantly changing its attitude angle until the vehicle moves to the proximity of the target parking position. When the own vehicle approaches one of the parked vehicles 2, the shifter is temporarily changed, and thereafter a parking path 121 that causes the attitude angle to be aligned on the target parking line 111 is determined by using the second own vehicle position target attitude angle computing module 18B.

As described above, according to the invention of Embodiment 3, the first own vehicle position target attitude angle computing module 18A and the second own vehicle position target attitude angle computing module 18B are switched according to the distance between the own vehicle position and the target point 112, which is the target parking position, thus making it possible to obtain a prominent effect that the time required for parking can be shortened.

Embodiment 4

Next, a vehicle steering control apparatus according to Embodiment 4 of the present invention will be described with reference to FIG. 8. According to the invention of Embodiment 3, the distance between the own vehicle position and the target parking position is used to switch between the first own vehicle position target attitude angle computing module 18A and the second own vehicle position target attitude angle computing module 18B, but they may be switched according to an obstacle (parked vehicle) position. The obstacle position as used herein refers to a parking space.

Figure 8:
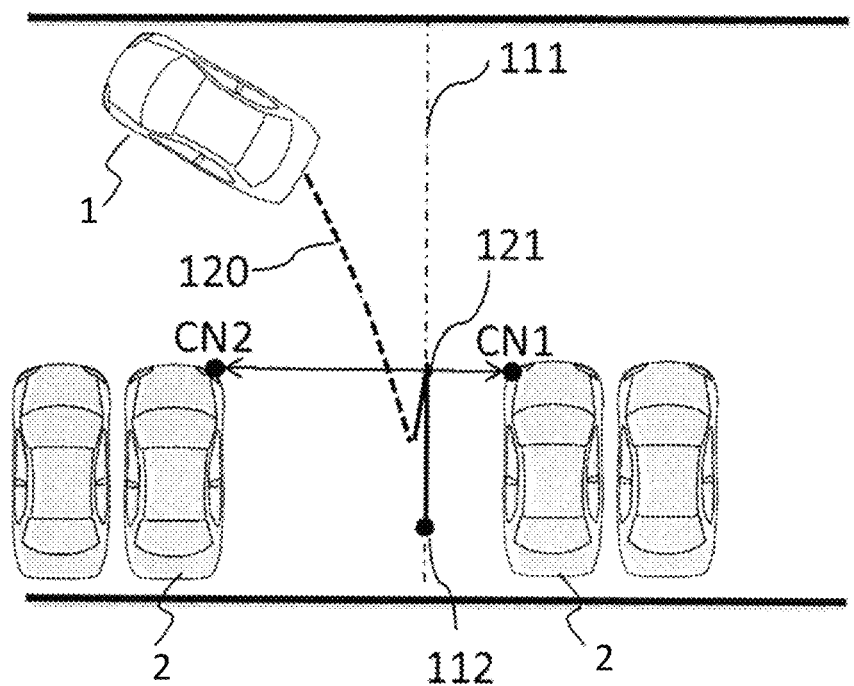
FIG. 8 is an explanatory diagram illustrating a parking path of a vehicle steering control apparatus according to Embodiment 4 of the present invention.
Figure 9:
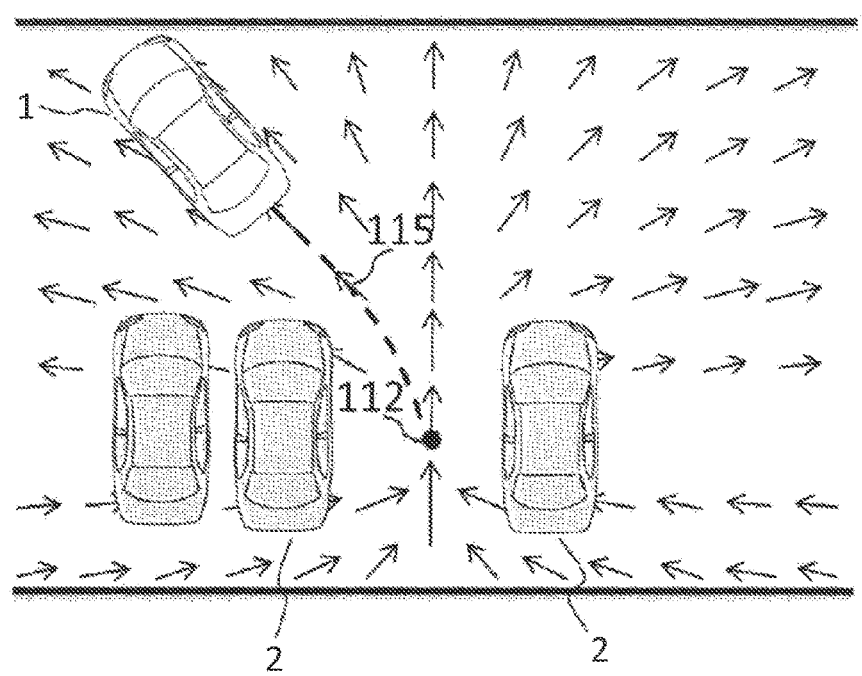
FIG. 9 is an explanatory diagram illustrating an example in which automatic parking according to Non-Patent Document 1 is applied.

FIG. 8 is an explanatory diagram illustrating a parking path based on a target steering angle calculation method performed by a vehicle steering control apparatus according to Embodiment 3. A parking space (CN1–CN2) is calculated from the obstacle position (the positions of the parked vehicles 2), and if the distance between the target point 112, which is the target parking position, and the own vehicle 1 is less than or equal to a threshold value, the second own vehicle position target attitude angle computing module 18B is preferentially used so as to correct the attitude angle of the own vehicle 1, instead of shortening the moving distance. On the other hand, if the distance between the target point 112 and the own vehicle 1 is greater than or equal to the threshold value, the first own vehicle position target attitude angle computing module 18A is used to cause the own vehicle 1 to move along the parking path 120 without significantly changing its attitude angle until the vehicle moves to the proximity of the target parking position. When the own vehicle 1 approaches one of the parked vehicles 2, the shifter is temporarily changed, and thereafter a parking path 121 that causes the attitude angle to be aligned on the target parking line 111 is determined by using the second own vehicle position target attitude angle computing module 18B.

As described above, according to the invention of Embodiment 4, the first own vehicle position target attitude angle computing module 18A and the second own vehicle position target attitude angle computing module 18B are switched according to the parking space, thus making it possible to achieve a prominent effect that the own vehicle attitude angle can be corrected according to the parking space and that the time required for parking can be shortened.

It is noted that, although the embodiments of the present invention have been described above, the present invention is not limited to the embodiments given above, and various design changes can be made, and the above embodiments may be freely combined with each other, or each of the above embodiments may be modified or abbreviated as appropriate within the scope of the present invention.

The invention claimed is:

1. A vehicle steering control apparatus comprising:
   a traveling direction detector for detecting a traveling direction of an own vehicle;
   a steering angle detector for detecting an actual steering angle of the own vehicle;
   an own vehicle position attitude angle computing module to calculate an own vehicle position and an own vehicle attitude angle from a reference point based on a vehicle signal from the own vehicle;
   an obstacle detector for detecting an obstacle around the own vehicle including a parked vehicle and outputting an obstacle detection result;
   a target parking position computing module to calculate a target parking position from the obstacle detection result;
   a target line computing module to calculate a target parking line passing through the target parking position based on an own vehicle target parking attitude calculated from the target parking position and an attitude of the parked vehicle;

a gain computing module to calculate a target attitude angle calculation gain and a target curvature calculation gain based on the obstacle detection result and the target parking position or the own vehicle position;

an own vehicle position target attitude angle computing module to calculate an own vehicle position target attitude angle based on the traveling direction, the own vehicle position, the target parking line, and the target attitude angle calculation gain;

an own vehicle position target curvature computing module to calculate an own vehicle position target curvature based on the own vehicle position, the own vehicle attitude angle, the target parking line, the target curvature calculation gain, and the own vehicle position target attitude angle; and a steering controller for calculating a target steering angle based on the own vehicle position target curvature and performing control such that the actual steering angle matches the target steering angle, wherein control is performed such that the own vehicle travels with the own vehicle position target attitude angle so as to be aligned on the target parking line.

2. The vehicle steering control apparatus according to claim 1, wherein
the own vehicle position target attitude angle computing module calculates the own vehicle position target attitude angle based on a difference between the target parking position included in the target parking line and the own vehicle position.

3. The vehicle steering control apparatus according to claim 1, wherein
the own vehicle position target curvature computing module calculates the own vehicle position target curvature based on a difference between the own vehicle position target attitude angle and the own vehicle attitude angle.

4. The vehicle steering control apparatus according to claim 1, wherein
the gain computing module is configured to variably set the target attitude angle calculation gain and the target curvature calculation gain based on a distance between the own vehicle position and the target parking line at a time of start of parking.

5. The vehicle steering control apparatus according to claim 1, wherein
the gain computing module is configured to fixedly set the target attitude angle calculation gain and the target curvature calculation gain based on an obstacle position determined from the obstacle detection result and the own vehicle position.

6. The vehicle steering control apparatus according to claim 1, wherein
the own vehicle position target attitude angle computing module includes:
a first own vehicle position target attitude angle computing module to calculate an own vehicle position target attitude angle such that the own vehicle converges on the target parking line at the own vehicle position target attitude angle; and
a second own vehicle position target attitude angle computing module to calculate an own vehicle position target attitude angle such that the own vehicle converges to the target parking position at the own vehicle position target attitude angle, and
the first own vehicle position target attitude angle computing module and the second own vehicle position target attitude angle computing module are switched according to a distance between the own vehicle position and the target parking line.

7. The vehicle steering control apparatus according to claim 1, wherein
the own vehicle position target attitude angle computing module includes:
a first own vehicle position target attitude angle computing module to calculate an own vehicle position target attitude angle such that the own vehicle converges on the target parking line at the own vehicle position target attitude angle; and
a second own vehicle position target attitude angle computing module to calculate an own vehicle position target attitude angle such that the own vehicle converges to the target parking position at the own vehicle position target attitude angle, and
the first own vehicle position target attitude angle computing module and the second own vehicle position target attitude angle computing module are switched according to a distance between the own vehicle position and the target parking position.

8. The vehicle steering control apparatus according to claim 1, wherein
the own vehicle position target attitude angle computing module includes:
a first own vehicle position target attitude angle computing module to calculate an own vehicle position target attitude angle such that the own vehicle converges on the target parking line at the target attitude angle; and
a second own vehicle position target attitude angle computing module to calculate an own vehicle position target attitude angle such that the own vehicle converges to the target parking position at the target attitude angle, and
the first own vehicle position target attitude angle computing module and the second own vehicle position target attitude angle computing module are switched according to at least the obstacle detection result.

9. The vehicle steering control apparatus according to claim 1, wherein each of said computing modules comprises at least one of a logic circuit and a CPU executing a program.

10. The vehicle control apparatus according to claim 1, wherein said target parking line is independent of said own vehicle position.

11. The vehicle control apparatus according to claim 1, wherein said target parking line is a straight line.

* * * * *